Jan. 30, 1945.　　　G. G. EISENBEIS　　　2,368,457
FLEXIBLE SHAFTING ASSEMBLY
Filed May 20, 1944　　　2 Sheets-Sheet 1
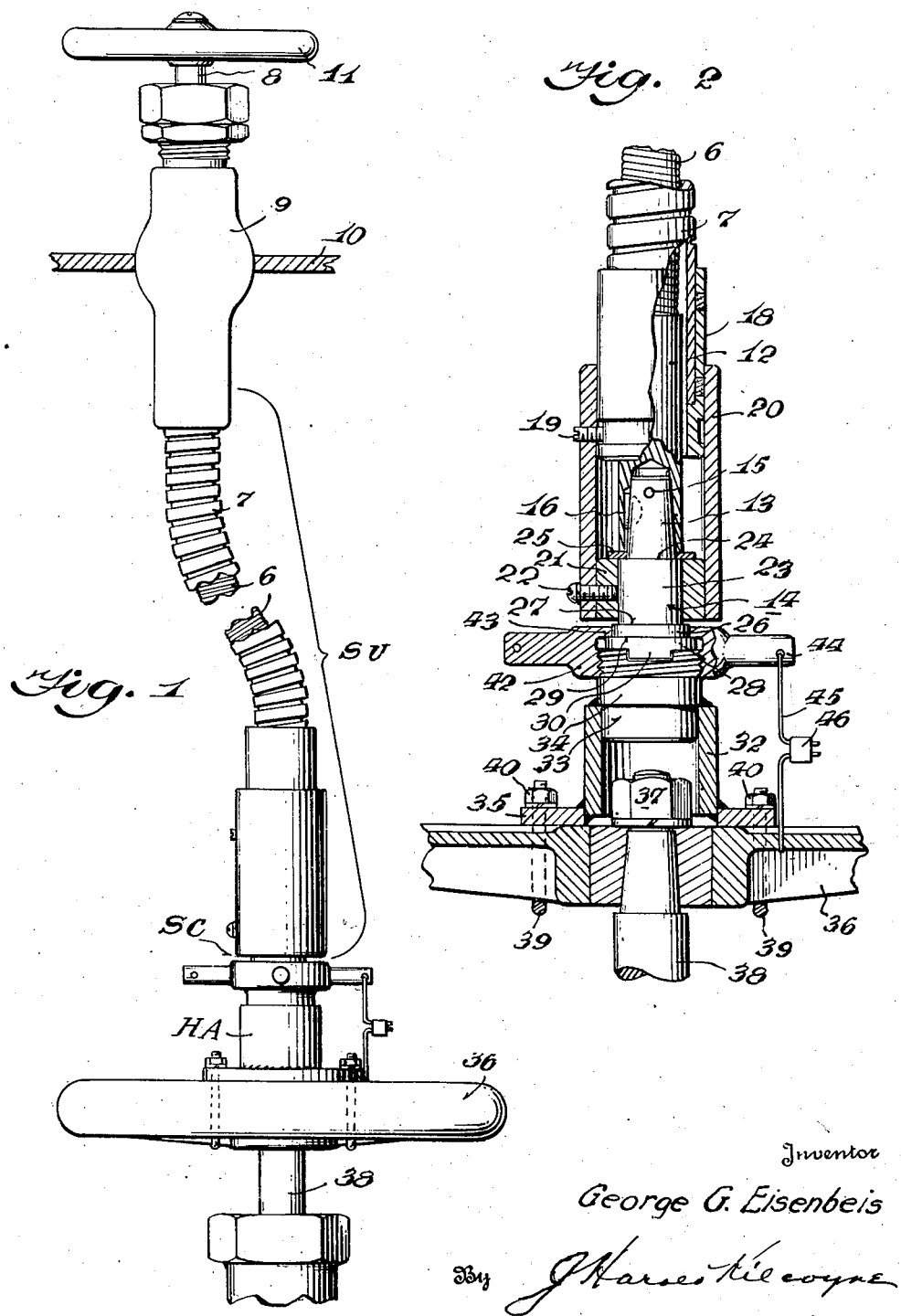
Inventor
George G. Eisenbeis
By J. Harses Kilcoyne
Attorney

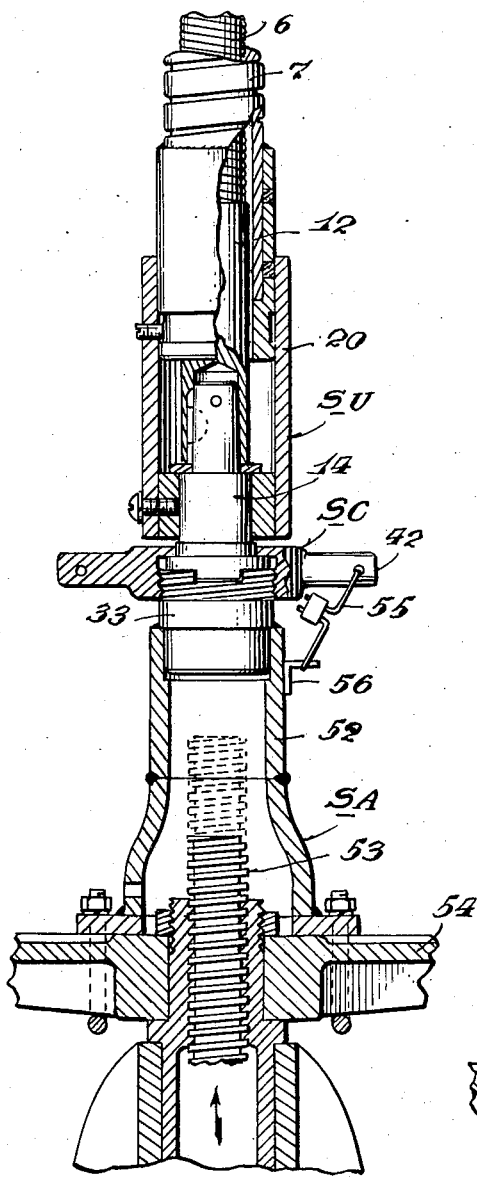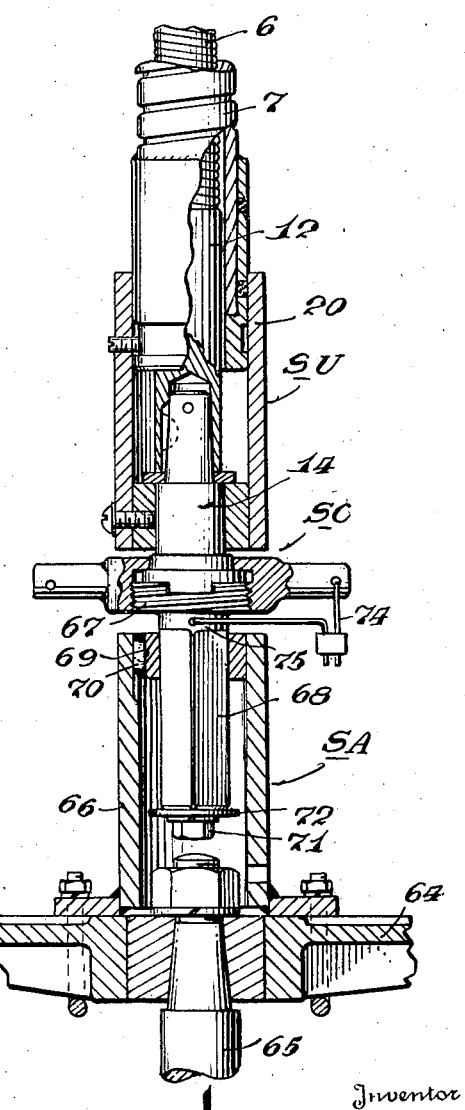

Patented Jan. 30, 1945

2,368,457

UNITED STATES PATENT OFFICE 2,368,457

FLEXIBLE SHAFTING ASSEMBLY

George G. Eisenbeis, Conklin, N. Y., assignor to Stow Manufacturing Co., Binghamton, N. Y., a corporation of New York Application May 20, 1944, Serial No. 536,561

7 Claims. (Cl. 137—139)

This invention relates to improvements in flexible shafting assemblies and more particularly to a flexible shafting assembly which, while not limited thereto, has especial utility as an actuator for the remote control of valves and like devices.

Among the objects of the invention may be noted the provision of an improved flexible shafting assembly of rugged yet simple construction and design capable of transmitting power from a drive terminal to a remotely positioned valve, for example; the provision of a flexible shafting actuator for the remote control of valves which is effective and efficient in operation and which may be affixed in simple manner to a valve to be actuated; the provision of a flexible shafting actuator for valves and the like which incorporates a flexible shafting unit adapted to be driven from a point remote from the valve, a valve operating means which is adapted to be permanently affixed to the valve, and a novel and improved quick disconnect coupling for detachably connecting the shafting unit and the operating means as aforesaid; and the provision of a novel and improved quick disconnect coupling operative between the shafting unit and the valve operating means as aforesaid to lock the coupled elements against accidental separation or disconnection.

Other objects will be in part obvious from the annexed drawings and in part hereinafter indicated in connection therewith by the following analysis of the invention.

In the drawings:

Fig. 1 is a part elevation of a flexible shafting assembly installation according to the invention, shown to extend from a deck station to a ship's valve located remotely therefrom;

Fig. 2 is an enlarged part section illustrating the coupling generally shown in Fig. 1, the operating means of the assembly being of the type suited for the actuation of a non-rising stem gate valve, for example;

Fig. 3 is a view similar to Fig. 2, illustrating a somewhat modified form of operating means for attachment to a rising stem gate valve;

Fig. 4 is a view similar to Figs. 2 and 3, illustrating a further embodiment of operating means as required for the actuation of globe and angle valves, for example.

Referring to the drawings, wherein like reference characters indicate like parts throughout the several views, a flexible shafting assembly according to the invention will be hereinafter described as an actuator for the remote control of a ship's valve, being shown in Fig. 1 as extending between a control station on an upper deck and the valve to be actuated, which latter will be understood to be located at a point remote from the control station. Such an assembly is constituted by a flexible shafting unit generally designated SU, Fig. 1, a valve operating means to be hereinafter referred to as a hand wheel adapter assembly HA, which is adapted to be more or less permanently secured to the valve hand wheel, and means to be described providing a quick disconnect coupling SC between the driven or take-off end of the shafting unit and the adapter assembly.

The flexible shafting unit SU, which is of length to extend from the control station to a point adjacent the valve, includes a shafting core 6 formed, for example, of a plurality of superimposed layers of wires helically wound on a central wire and being enclosed within a conventional metallic casing 7. The core at its driving end terminates in a drive fitting 8 rotating within the sleeve 9 of a bulkhead or deck terminal extending through a bulkhead or deck plate 10, and which is preferably of the type disclosed in my copending application Serial No. 524,958, filed March 3, 1944. The drive fitting 8 thus pierces the bulkhead wall or deck plate 10 and carries at its relatively outer end a hand wheel 11 for rotating the core relative to casing 7, the latter being fixedly secured within the terminal sleeve 9. Other means for operating the drive fitting and core may of course be substituted under conditions requiring power actuation, for example.

At its driven or take-off end (Fig. 2), the shafting core 6 terminates in an elongated fitting 12 provided at its end with a socket for receiving the reduced shank 13 of an adapter end 14 of the adapter assembly HA to be described, which as shown is coupled to the fitting by a taper pin 15 and by a Woodruff key 16 to turn with fitting and core.

The casing 7 terminates in a ferrule 18 which in final assembly is interiorly secured as by a set screw 19 threaded into one end of a terminal sleeve 20, so that its tip seats in an annular groove formed in the ferrule, the sleeve providing a housing which substantially encloses the fitting 12 and adapter end 14. The other end of the terminal sleeve 20 carries an internal bushing 21 of bearing metal secured in place as by a machine screw 22, the inner diameter of the bushing being such as to provide turning clearance for the enlarged cylindrical bearing portion 23 of the adapter end 14, which is separated from the shank end 13 thereof by a shoulder 24. Hence, by the described arrangement, the adapter end is journaled for rotation relative to the terminal sleeve 20 in the bearing bushing 21 carried thereby. A washer 25 disposed on the shank end 13 of the adapter end is positioned between the end face of the fitting 12 and the adapter shoulder 24, its external diameter being such that the washer laps the inner end face of the bearing bushing 21 and thus serves to prevent wear on the latter by the fitting, and also to locate the adapter end with its shoulder aligned with said bushing end face.

The adapter end extends beyond the terminal sleeve 20 and is formed with a large diameter neck portion 26 separated from the cylindrical portion 23 thereof by a shoulder 27, and a head portion 28 having larger diameter than the adapter neck portion and being separated from the latter by a shoulder 29. The end face of the adapter head is provided with a transverse tongue or rib 30 for the purpose to be hereinafter described.

Considering now the hand wheel adapter assembly HA, such includes a sleeve 32 into one end of which extends the shouldered adapter body or plug 33, the upwardly extending head 34 of which is threaded and extends beyond the sleeve end and has an end face provided with a transverse groove adapted to mate with the tongue 30 of the adapter end 14. The adapter body is fixedly secured to the sleeve 32 as by welding along its shoulder, as indicated, whereby rotation thereof is transmitted to the sleeve. The other end of the sleeve carries a radial flange 35 which is shown as welded to the sleeve, although the flange may be formed integral. Where the flexible shafting assembly of the invention is employed to actuate a valve, the adapter assembly is more or less permanently secured to the hand wheel 36 with which the valve is conventionally provided, by locating the sleeve over the end nut 37 employed to secure the hand wheel to the valve stem 38, and thereupon securing the flange 35 to the hand wheel spokes by means such as the U-bolts 39, the threaded ends of which are held by nuts 40. Other forms of securement between the adapter assembly and the valve may of course be substituted and, where the flexible shafting assembly is employed to actuate devices other than valves, the adapter assembly will of course be modified to adapt it to such devices.

In the illustrated embodiment, it will be observed that the internal diameter of the sleeve 32 is somewhat greater than that of the nut 37, so that the sleeve may be readily placed over the latter. Where the assembly is employed to actuate a valve of the non-rising stem type, as in the Fig. 1 illustration, the height of the sleeve 32 need be only that required to accommodate for the height of the nut 37 and the depth of insertion of the adapter body 33 into the sleeve, with suitable clearance.

The invention also provides a novel quick disconnect coupling SC adapted to secure the adapter end 14 and the adapter body 33 in coupled relation. To this end, the head 28 of the adapter end carries a freely rotatable coupling nut 42 which is interiorly threaded as shown and which, moreover, is provided with an internal flange 43 turning on the neck portion 26 thereof. It will be observed that the inner face of the coupling nut flange 43 is adapted to bear on the shoulder 29 between the neck and head portions of the adapter end, the flange further serving to secure the coupling nut in the space between the shoulder 29 and the adjacent end faces of the terminal sleeve 20 and bushing 21 carried thereby. Operating arms 44 are provided on the coupling nut to assist in turning thereof relative to head of the adapter end. Hence, upon registering of the tongue and groove of the adapter end and body members, the coupling nut 42 can be threaded on to the head of the adapter body 33, both to secure the parts in coupled relation and to effect rotation of hand wheel adapter assembly from the shafting core.

It will be observed that when so coupled the internal flange 43 of the coupling nut bears against the head shoulder 29 of the adapter end and thus locks the latter against endwise lifting movement as would tend to result in separation of the coupled elements, a condition which might occur when the flexible shafting unit is tensioned.

Assuming the hand wheel adapter assembly as described to be bolted to the operating hand wheel of a valve, as above indicated, and with the adapter end 14 having driving connection with the core fitting 12 as shown, the take-off end of the shafting unit may be coupled thereto by the simple operation of registering the tongue and groove of the adapter end and adapter body, respectively, and thereupon screwing down on the coupling nut 42. The aforesaid quick disconnect coupling is of particular advantage not only in effecting quick coupling of the parts but also in disconnecting the flexible shafting unit from the sleeve assembly for repair or replacement of the former. In assembling or disassembling the core fitting with or from the adapter end 14, the casing terminal sleeve 20 can be bodily raised along the casing by unthreading screws 19 and 22, thus to give access to the taper pin 15. With the adapter end initially coupled to the adapter body, the latter procedure of raising the sleeve along the core is followed in effecting driving connection between the core fitting and adapter end.

If desired, the coupling may be sealed to prevent unauthorized disconnection of the flexible shafting unit from the valve, through the provision of a sealing wire 45 looped around a spoke of the valve operating hand wheel and threaded through an aperture provided in one of the arms of the coupling nut, the ends of the wire being sealed, for example, by a lead plug 46.

Fig. 3 illustrates a modified construction of adapter assembly for securement to the hand wheel of a gate valve of the rising stem type. According to the illustrated variant, the sleeve 52 of the adapter assembly has extended height to provide for the rise of the valve stem 53 to its dotted line position corresponding to full opening of the valve, and its lower end is filleted or swelled outwardly as shown to provide the increased diameter permitting the lower end of the sleeve to fit over the stem and associated valve parts.

The flexible shafting unit and the adapter assembly may be sealed in coupled relation to prevent unauthorized disconnection of the parts by a sealing wire 55 anchored at one end in an angled bracket 56 secured to the upper end of the sleeve 52 and threaded at its other end through an opening provided in an operating arm of the coupling nut 42 of the flexible shafting unit.

Fig. 4 is illustrative of a modified construction of adapter assembly designed for globe and angle valves of the type in which the hand wheel 64 as well as the stem 65 rises when the hand wheel is turned in valve opening direction. With the valve in full open position as shown, it will be observed that a substantial rise of the sleeve 66 with the valve hand wheel relative to adapter body must be provided for. To this end, relative axial movement between the sleeve 66 and the threaded adapter body 67 is permitted by forming the lower end 68 of the adapter body, which corresponds to the plug end thereof illustrated in Figs. 2 and 3, as a part separate from the sleeve having extra length at least equal to the rise of the sleeve, and square (or other polygonal) section. The square end of the adapter body operates in an opening shaped to correspond to the square (or other polygonal) section of the adapter end 68, of an internal drive bushing 69 secured at the upper end of the sleeve 66 as by a key 70 and brazing as shown, thus to form an integral part of sleeve 66. With the square end of the adapter body and the bushing 69 providing a driving connection to the sleeve 66, sleeve 66 may also rise to the extreme valve-open position shown and thereupon lower with the valve hand wheel and stem, along the length of the end 68 of the adapter body. To prevent separation of the threaded head 67 and its squared lower end from the sleeve 66, the former at its lower or free end is provided with a stop washer 72 of larger outer diameter than the square end 68 thereof, being secured by a bolt 71 and intermediate lock washer. Thus, any attempt to separate the threaded head and the squared lower end of the adapter body from the sleeve assembly, as by raising the former from the sleeve 66, is resisted by washer 72 coming into engagement with the lower end face of the bushing 69. As with the Fig. 2 modification, the flexible shafting unit and operating sleeve assembly may be sealed in coupled relation by sealing wire 74 anchored to a coupling nut arm 42 and threaded through an aperture formed in the neck portion 75 of the threaded adapter part 67.

Without further analysis, it will be seen that the invention provides a novel and improved flexible shafting assembly having especial utility as an actuator for the remote control of valves and like devices. The component parts of such an assembly, i. e. the flexible shafting unit and the hand wheel adapter assembly, may be assembled complete at the factory and shipped ready for installation. To install, the flexible shafting unit is mounted from the bulkhead or deck terminal at which the control of the valve is to be effected, the take-off end thereof extending to a point adjacent the valve to be actuated. Usually, the flexible shafting unit is fastened to the ship (or building) structure by means of clips which may be applied at predetermined points along the length of the shafting unit to secure the same in place. Installation of the hand wheel adapter assembly may be readily effected by passing U-bolts over the spokes of the valve hand wheel and bolting the same to the securing flange or equivalent provided at the end of the adapter assembly. Thereupon, assuming the adapter end 14 to be coupled to the core fitting 12, the flexible shafting unit is coupled to the sleeve assembly by the simple procedure of registering the tongue and groove of the adapter end and body parts and threading the coupling nut on to the threaded head of the adapter body, such operation functioning to lock the adapter parts in coupled relation as aforesaid. The coupling means as described furthermore serves as a means for quickly uncoupling the flexible shafting unit from the hand wheel adapter assembly, as required in replacement or repair of the shafting unit.

As many changes could be made in carrying out the above constructions without departing from the scope of the invention, it is intended that all matter contained in the above description or shown in the accompanying drawings shall be interpreted as illustrative and not in a limiting sense.

I claim:

1. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, and a hand-wheel adapter assembly comprising a sleeve secured at its one end to the hand wheel so as to turn the latter and carrying at its other end separable adapter body and end parts, the adapter end part having a reduced diameter shank portion extending into the driven fitting socket, means providing a driving connection between the driven fitting and the adapter shank portion, and means providing a quick detachable coupling between the separable adapter body and end parts.

2. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, and a hand wheel adapter assembly comprising a sleeve secured at its one end to the hand wheel so as to turn the latter and carrying at its other end separable adapter body and end parts, of which the adapter body part has a portion extending into and drivingly connected with the sleeve, the adapter end part having a reduced diameter shank portion extending into the driven fitting socket, means providing a driving connection between the driven fitting and the adapter shank portion, and means providing a quick detachable coupling between the separable adapter body and end parts.

3. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, and a hand wheel adapter assembly comprising a sleeve secured at its one end to the hand-wheel so as to turn the latter and carrying at its other end separable adapter body and end parts, the adapter end part having a reduced diameter shank portion extending into the driven fitting socket, means providing a driving connection between the driven fitting and the adapter shank portion, and a quick detachable coupling operable between said adapter body and end parts including a coupling nut bodily carried by said adapter end part.

4. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, and a hand-wheel adapter assembly comprising a sleeve secured at its one end to the hand-wheel so as to turn the latter and carrying at its other end separable adapter body and end parts, of which the adapter body part is drivingly secured to the sleeve and has a head portion provided with threads, the adapter end part having a reduced diameter shank portion extending into the fitting socket and neck and head portions of stepped diameter with an intermediate shoulder therebetween, means providing a driving connection between the driven fitting and the adapter shank portion, and means coupling the head portions of the adapter body and end parts comprising a tongue and groove connection between said heads, and a coupling nut adapted to be threaded onto the head of the adapter body part, said nut having a flange turning on the neck portion of the adapter end part and bearing against the shoulder intermediate the neck and head portions of said end part.

5. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, and a hand-wheel adapter assembly comprising a sleeve secured at its one end to the hand-wheel so as to turn the latter and carrying at its other end separable adapter body and end parts, a driving connection between the adapter body part and the sleeve providing for relative axial movement therebetween, said adapter end part having a reduced diameter shank portion extending into the driven fitting socket, means providing a driving connection between the driven fitting and the adapter shank portion, and means providing a quick detachable coupling between the separable adapter body and end parts.

6. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, and a hand-wheel adapter assembly comprising a sleeve secured at its one end to the hand-wheel so as to turn the latter and carrying at its other end separable adapter body and end parts, of which said body part has polygonal section and extends to an opening of like section in the upper end of the sleeve, whereby to provide a driving connection permitting relative axial movement between the sleeve and adapter body part, the adapter end part having a reduced diameter shank portion extending into the driven fitting socket, means providing a driving connection between the driven fitting and the adapter shank portion, and means providing a quick detachable coupling between the separable adapter body and end parts.

7. A flexible shafting assembly for operating valves and like devices provided with an operating hand-wheel from a distance, comprising a flexible shafting unit including a rotary core and a stationary enclosing casing, the core being provided with a driving terminal at an end thereof remote from the valve to be actuated and a driven fitting at its other end provided with a socket, the casing extending to a terminal sleeve carrying an interior wear bushing and surrounding the driven fitting, and a hand wheel adapter assembly comprising a sleeve secured at its one end to the hand-wheel so as to turn the latter and carrying at its other end separable adapter body and end parts, the adapter end part having a reduced diameter shank portion extending into the fitting socket and a cylindrical bearing portion turning in said wear bushing, means providing a driving connection between the driven fitting and the shank portion of the adapter end part, and means providing a quick detachable coupling between the separable adapter body and end parts.

GEORGE G. EISENBEIS.